United States Patent [19]

Baumgart et al.

[11] Patent Number: 4,820,322

[45] Date of Patent: Apr. 11, 1989

[54] METHOD OF AND APPARATUS FOR OVERCLADDING A GLASS ROD

[75] Inventors: Jerry W. Baumgart, Norcross; Anthony T. D'Annessa, Marietta, both of Ga.; Franz T. Geyling, Morristown, N.J.; William M. Flegal, Tucker, Ga.; Thomas J. Miller, Belle Mead, N.J.

[73] Assignees: American Telephone and Telegraph Company AT&T Bell Laboratories, Murray Hill; AT&T Technologies, Inc., Berkeley Heights, both of N.J.

[21] Appl. No.: 99,441

[22] Filed: Sep. 23, 1987

Related U.S. Application Data

[63] Continuation of Ser. No. 856,739, Apr. 28, 1986, abandoned.

[51] Int. Cl.[4] .......................................... C03B 37/025
[52] U.S. Cl. .................................. 65/3.11; 65/4.2; 65/13
[58] Field of Search ............... 65/2, 3, 11, 3.12, 13, 65/4.2, 4.21

[56] References Cited

U.S. PATENT DOCUMENTS

| | | | |
|---|---|---|---|
| 3,455,667 | 7/1969 | Snitzer et al. | 65/4.2 |
| 4,123,483 | 10/1978 | Naknara et al. | |
| 4,154,591 | 5/1979 | French et al. | |
| 4,184,859 | 1/1980 | Maklad | |
| 4,283,213 | 8/1981 | Akers et al. | 65/2 X |
| 4,326,869 | 4/1982 | Kurosaki et al. | 65/3.11 X |
| 4,505,729 | 8/1985 | Matsumura et al. | 65/3.11 |
| 4,551,162 | 11/1985 | Hicks, Jr. | |
| 4,569,589 | 6/1986 | Perry | 65/3.12 |
| 4,578,096 | 3/1986 | Siegmund | 65/3.11 |

FOREIGN PATENT DOCUMENTS

| | | |
|---|---|---|
| 3521684 | 8/1984 | Australia . |
| 54-131043 | of 0000 | Japan .......................... 65/3.11 |
| 57-19064 | of 0000 | Japan . |
| 53-133044 | of 0000 | Japan .......................... 65/3.11 |
| 2106892 | of 0000 | United Kingdom . |
| 2148874 | 6/1985 | United Kingdom . |

OTHER PUBLICATIONS

Csencsits, et al., app. Ser. No. 447,417, Filed 12/2/82.
T. J. Miller and F. T. Geyling; "One Dimensional Models for the Co—Drawing of Preform Rods in Tubes", Journal of Lightwave Technology, vol. LT—2, No. 4, Aug. 1984.

Primary Examiner—Robert L. Lindsay
Attorney, Agent, or Firm—Edward W. Somers

[57] ABSTRACT

Method and apparatus are provided for overcladding a preform rod (22). The preform rod is aligned with and inserted into an overcladding tube (30). The outer diameter of the preform rod and the inner diameter of the tube are such that the clearance between the tube and the rod does not exceed a predetermined value. Successive increments of length of the tube and rod therein are subjected to a controlled zone of heat while the pressure inside the tube is maintained at a value which is substantially less than that outside the tube. This causes the tube to be collapsed onto the preform rod to provide an overclad preform and subsequently a drawn optical fiber in which the overcladding is substantially concentric with respect to the optical fiber core.

23 Claims, 5 Drawing Sheets

Fig_1

Fig. 10

METHOD OF AND APPARATUS FOR OVERCLADDING A GLASS ROD

This is a continuation of Application Ser. No. 856,739, filed Apr. 28, 1986, now abandoned.

TECHNICAL FIELD

This invention relates to methods of and apparatus for overcladding a glass rod. More particularly, this invention relates to methods and apparatus for causing a glass tube to be collapsed onto a glass rod to provide an optical fiber preform having a relatively thick wall.

BACKGROUND OF THE INVENTION

Optical fiber of the type used to carry optical signals is fabricated typically by heating and drawing a portion of an optical preform comprising a refractive core surrounded by a protective glass cladding. Presently, there are several known processes for fabricating preforms. The modified chemical vapor deposition (MCVD) process, which is described in U.S. Pat. No. 4,217,027 issued in the names of J. B. MacChesney et al. on Aug. 12, 1980 and assigned to Bell Laboratories, Inc., has been found most useful because the process enables large scale production of preforms which yield very low loss optical fiber.

During the fabrication of preforms by the MCVD process, precursor, reactant-containing gases, such as $SiCl_4$ and $GeCl_4$ are passed through a rotating substrate tube which is made of silica glass. A torch heats the tube from the outside as the precursor gases are passed therethrough, causing deposition of submicron-sized glass particles on the inside surface of the tube. The torch is moved along the longitudinal axis of the tube in a plurality of passes to build up layer upon layer of glass to provide a preform tube. Once a sufficient number of layers have been deposited, the preform tube is then heated to cause it to be collapsed to yield a preform or preform rod as it is often called.

Increased demand for optical fiber has prompted efforts to increase the productivity of the MCVD process. However, the MCVD process rate is limited by the thickness of the wall of the substrate tube. To obtain optical fiber having optimal optical and geometrical characteristics, the preform must have a core-to-cladding mass ratio within specified limits. Increasing the mass of the substrate tube to obtain a larger preform requires that the wall of the substrate tube be made thicker. Increasing the thickness of the wall of the substrate tube, however, reduces the rate of heat transfer to the reactant-containing gases, thereby increasing the time required to deposit each layer of glass particulates. If the wall of the substrate tube is too thick, then insufficient heat transfer may occur, which may result in the formation of bubbles or incomplete sintering.

One way in which the productivity of the MCVD process can be increased is first to produce an undercladded preform, having a larger than desired core-to-cladding mass ratio. This preform is inserted into a glass tube which is referred to as an overcladding tube and which is then collapsed onto the preform. This is referred to as the rod and tube technique. It is desirable that any added eccentricity of material about the preform core due to overcladding should be mimimized.

Insertion of the preform into the overcladding tube has been accomplished manually. Contact of the preform with the inside surface of the tube has not been found to be detrimental for present proof test levels of interest. However, radial misalignment between the overcladding tube and the undercladded preform should be minimized, otherwise the resultant drawn fiber core may be too eccentric which inhibits proper splicing of the drawn fiber to another. More sophistricated methods and apparatus for inserting a glass rod into a glass tube are known.

Collapse of the tube onto the preform rod while the tube and rod are mounted in a horizontal lathe has been acomplished using an oxy-hydrogen torch such as one shown in U.S. Pat. No. 4,231,777 which issued on Nov. 4, 1980 in the names of B. Lynch and F. P. Partus. Because that torch has a relatively wide hot zone which does not have a sharply defined end, it has been found that air pockets become trapped between the tube and the preform rod during collapse and manifest themselves as air lines in the fiber, resulting in fiber breaks at low proof test levels. This problem may be overcome by gaseous cooling of the tube ahead of the torch, but this increases the hydrogen demand in the torch and may increase the likelihood of contaminating the tube surface. Voids also may occur at the interface between the preform rod and the tube because of non-concentric collapse of the tube on the rod.

Instead of being accomplished on a horizontal lathe, the collapse of the tube on a preform rod has been acomplished in a furnace. Typically, this has been accomplished by inserting the preform rod into an overcladding tube and then moving the rod and tube coaxially through a draw furnace which causes collapse prior to the drawing of the fiber. See U.S. Pat. No. 4,547,644, which issued on Oct. 15, 1985 in the names of W. C. Bair et al for a typical optical fiber drawing furnace. The fiber drawing process itself is relatively unaffected by tube collapse during drawing. However, the optical fiber draw rate may be reduced if the time required for collapsing the overcladding tube is the rate-limiting step of the fiber drawing process. Further, centering of the tube and inserted preform rod may be a problem in using the furnace to collapse the tube onto the preform rod. However, this may be overcome by a centering technique referenced to the optical fiber instead of to the preform rod.

Collapse of an overcladding tube onto a preform rod on a lathe subjects the preform to an extra heat treatment which is not required for furnace collapse. However, by accomplishing collapse on a lathe, the heat treatment step also acts to provide fire polishing of the overclad preform. The fire polishing step which is a surface treatment that removes defects causes the proof test yield of the drawn fiber to be increased.

U.S. Pat. No. 4,505,729 issued to H. Matsumura et al. on Mar. 19, 1985, discloses a method for producing an optical fiber preform the steps of which are a variation of the rod and tube technique discussed above. According to the Matsumura et al. method, a layer of doped glass particles is deposited on the inner surface of a quartz substrate tube. A glass rod is inserted into the substrate tube. The substrate tube, with the rod coaxially inserted therein, is then collapsed while the internal pressure of the tube is reduced slightly to provide a preform in which a cladding or jacket thereof is elliptic in cross section.

What is needed and what seemingly is not provided by the prior art are methods and apparatus for overcladding expeditiously a preform rod without degradation of fiber strength or core concentricity. The sought after methods and apparatus that cause a glass tube, into which a glass preform rod has been inserted, to be collapsed onto the rod should result in a preform having substantially concentric layers with no air pockets at the interface between the rod and the tube. Desirably, such sought after methods and apparatus will increase the capacity of existing plant facilities. Inasmuch as increased fiber output can be more than offset by a decrease in the yield, care must be taken to insure that the sought after collapse process for rod and tube manufacture does not result in a decreased yield.

SUMMARY OF THE INVENTION

The foregoing problems have been solved by the methods and apparatus of this invention which provide an overclad preform. Initially, a preform rod and a tube which have predetermined optical and geometrical characteristics and which are substantially straight are provided. The preform rod is aligned with the tube after which relative motion is caused between them to cause a substantial portion of the rod to become disposed within the tube. The outer diameter of the preform rod and the inner diameter of the tube disposed thereabout are such that the difference therebetween does not exceed a predetermined value. Successive portions of length of the tube and the preform rod therein are subjected to a controlled zone of heat while a pressure gradient between the outside and the inside of the tube is established such that the pressure outside is substantially greater than that inside.

In a preferred embodiment, the pressure inside the tube is caused to be substantially less than ambient. In the preferred embodiment, the pressure inside the tube is about 0.15-0.2 atmosphere whereas outside, the ambient pressure is atmospheric.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
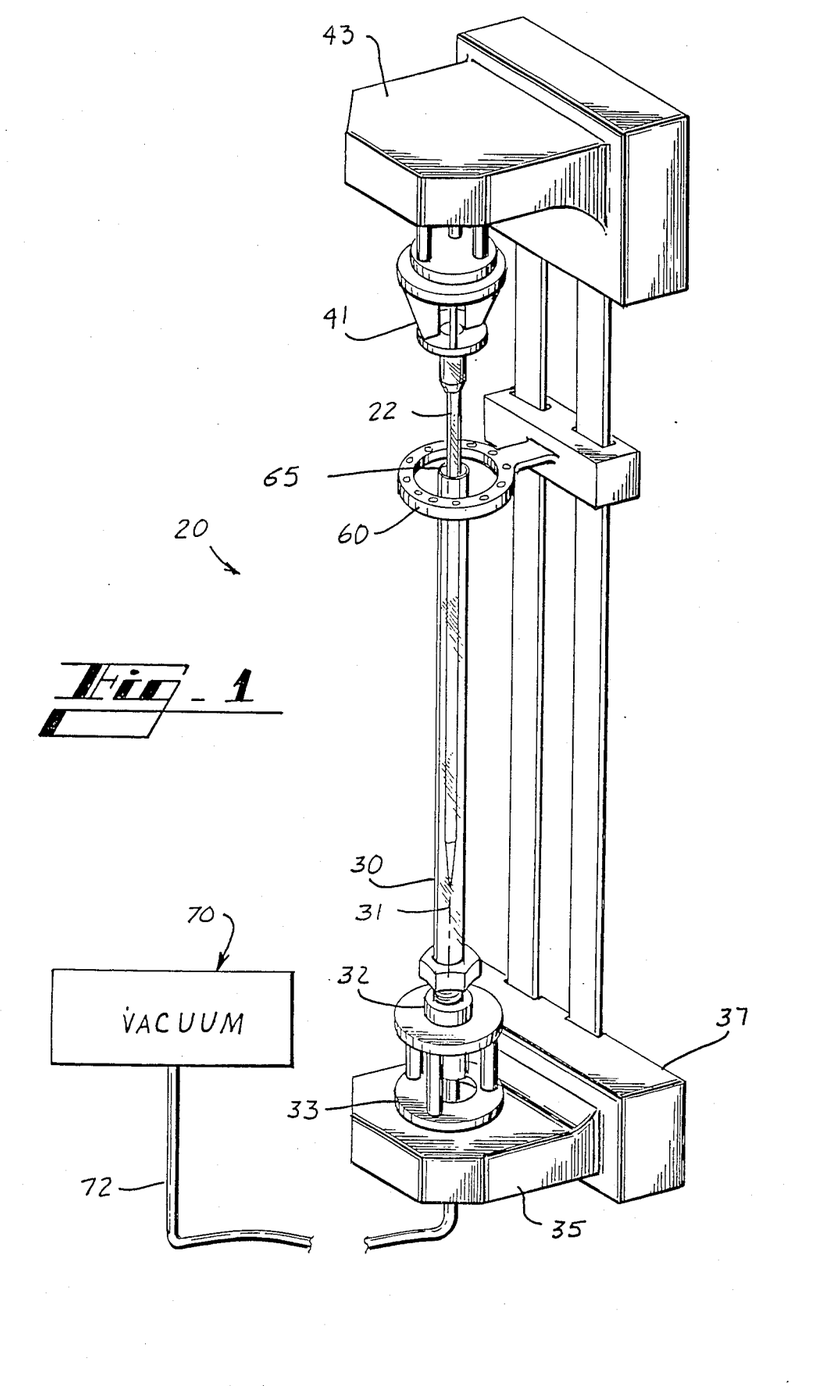
FIG. 1 is a perspective view of an apparatus for causing a preform rod to be inserted into and aligned with a tube and for causing the tube to be collapsed onto the preform rod.
Figure 2:
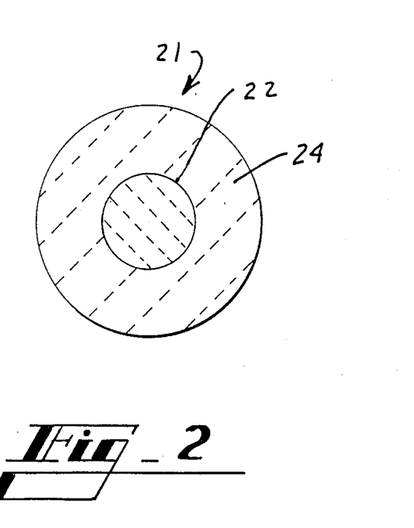
FIG. 2 is an end cross sectional view of an overclad preform which is provided by methods and apparatus of this invention.

Referring now to FIG. 1, there is shown an apparatus, which is designated generally by the numeral 20 and which is used to provide a preform 21 (see FIG. 2) which comprises a preform rod 22 and an overcladding 24. The preform rod 22 is one which includes a core and cladding each having predetermined optical and geometrical characteristics. The preform rod 22 may be manufactured by the well-known process which is referred to as modified chemical vapor deposition (MCVD), for example. For a disclosure of the MCVD process, see priorly mentioned U.S. Pat. No. 4,217,027 which is incorporated by reference hereinto.

Figure 3:
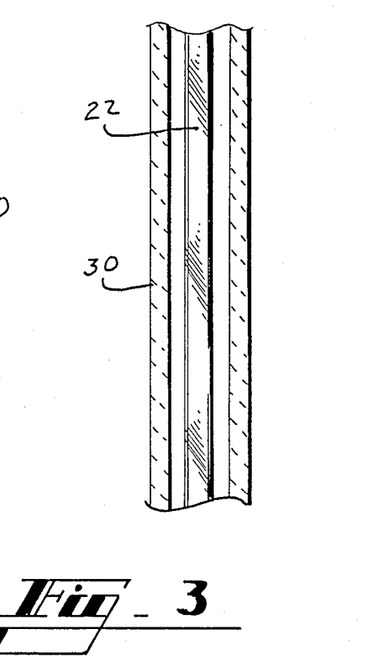
FIG. 3 is an elevational view in section which shows a preform rod disposed in a tube with the difference between the diameter of the preform rod and the inner diameter of the tube being exaggerated for purposes of clarity.
Figure 4:
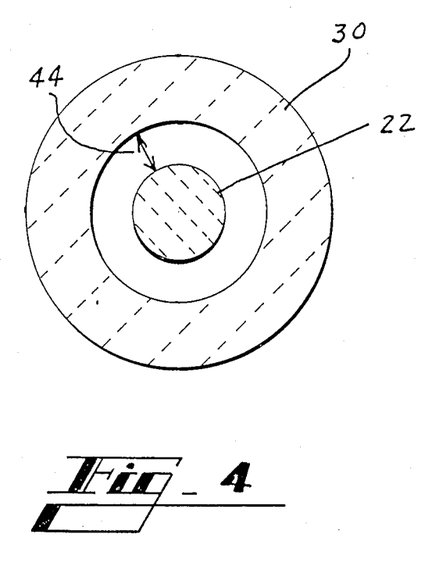
FIG. 4 is an end sectional view of the rod and tube of FIG. 3.

The preform rod 22 is to be provided with the overcladding 24 in order to improve production efficiency. This is accomplished by providing a tube 30 (see FIGS. 1 and 3-4) which is made of glass having predetermined optical and geometrical characteristics, by causing the preform rod 22 to become disposed within the tube 30 and by causing the tube to become collapsed onto the rod (see FIG. 2). In order to help to insure concentricity of the collapsed tube and the core of the preform rod 22, the tube and particularly the preform rod which is inserted into the tube 30 must be substantially straight.

As can be seen in FIG. 1, the tube 30 is caused to be mounted with a longitudinal axis 31 thereof extending vertically. Also, the tube 30 is mounted in a gimbal-type chuck 32 which is mounted in a holder 33 supported on a lower arm 35 of a vertical lathe frame 37, so that it is hinged and can be moved pivotally in any direction about its base. Advantageously, the lower chuck 32 also provides a seal with the outer surface of the tube 30. The preform rod 22 is suspended from an overhead chuck 41 and aligned with the tube. The chuck 41 is supported from an upper arm 43 which is cantilevered from the lathe frame 37. Afterwards, relative motion is caused between the lower and upper lathe arms 35 and 43, respectively, and hence between the tube and the preform rod to cause a substantial portion of the length of the preform rod to become disposed within the tube.

Steps are taken in order to maintain substantial concentricity of the tube 30 with respect to the preform rod 22. The preform rod 22 must be substantially straight. Also, a clearance 44 (see FIG. 4) at any point between the outer surface of the preform rod 22 and the inner surface of the tube 30 is controlled. This is accomplished by selecting the tube 30 and the preform rod 22 so that the difference between the inner diameter of the overcladding tube 30 and the outer diameter of the preform rod is such that the clearance is no greater than a predetermined value. For example, for a preform rod having an outer diameter of 17.5 mm and a tube having an inner diameter of 19 mm, that predetermined value is 1.5 mm. Of course, the rod should be disposed concentrically within the tube (see FIG. 4), providing a uniform clearance 44 desirably which is no greater than about 0.75 mm.

Figure 5:
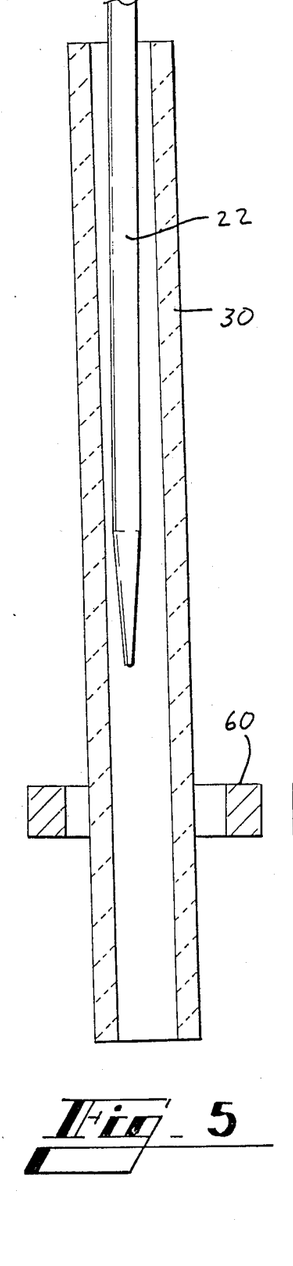
FIGS. 5-7 are a sequence of views which depict the alignment of a preform rod within a tube.

Although it is preferred that the preform rod 22 be centered within the tube 30 at the outset, this objective is not always achieved upon insertion and the rod sometimes touches the tube prior to collapse or is not concentric therewith (see FIG. 5). Should there be a pre-collapse touching or non-concentric condition, the resulting overclad preform will have a center which is offset from the center of the preform rod 22 provided by the MCVD process. The distance from the center of the core of the preform rod 22 to the center of the assembly of the preform rod and the cladding tube 30 is termed the eccentricity.

Accordingly, in order to reduce the precollapse eccentricity of the preform rod 22 in the tube 30, the tube is caused to be provided with an offset. This movement is facilitated by the gimbal-type joint of the tube at its base which permits pivotal movement in any direction.

Figure 6:
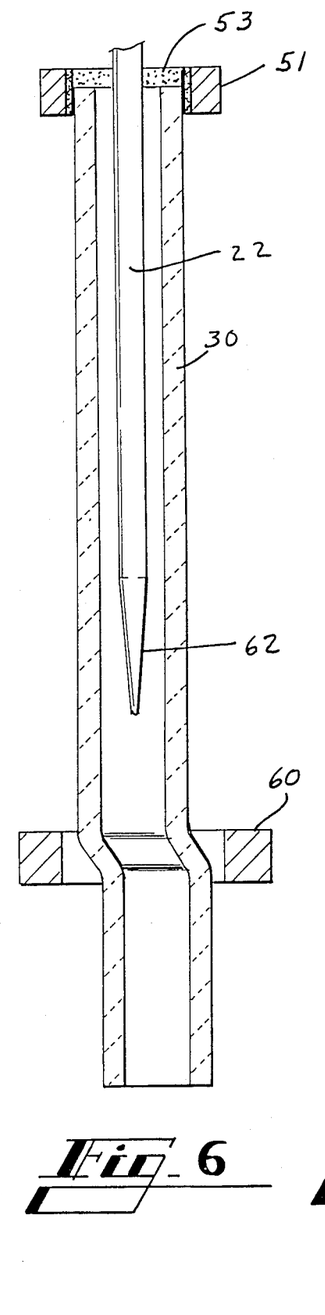

Prior to beginning the collapse mode, the position of the preform rod 22 is caused to be adjusted vertically with respect to the tube 30. Initially, an operator positions a centering collar 51 about an upper end of the tube 30 (see FIG. 6). Disposed within the centering collar 51 is an annulus 53 of a resilient material, for example. The resilient material engages the preform rod 22 and the tube 30 and causes the rod to be centered within the tube 30 at the location of the collar. Then a ring-type torch 60 having a construction similar to that of the torch shown in U.S. Pat. No. 4,477,244, which issued in the names of J. R. Nis and C D. Spainhour on Oct. 16, 1984 and which is incorporated by reference hereinto, is caused to dwell at a location about 10 cm below a free end 62 (see FIG. 6) of the preform rod. The torch 60, which may be an oxy-hydrogen torch, for example, circumscribes the entire periphery of the tube 30. Of course, a torch which circumscribes only part of the tube 30 could be used. As the tube 30 and the rod 22 are caused to turn rotatably about their longitudinal axes, the torch 60 heats the tube 30 sufficiently to allow the tube to reposition itself and form an offset 63 (see FIG. 7) at the location of the dwell of the torch, allowing the tube to become centered about the preform rod 22. In effect, the tube 30 is stress-relieved by heating it at a specific location and by allowing it to align itself with the preform rod 22.

Figure 7:
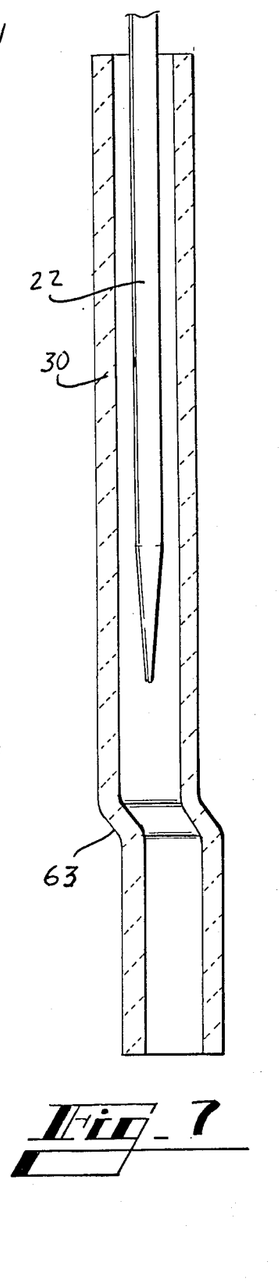

The effect of the offset 63 is to cause a substantial portion of the preform rod 22 to be aligned substantially concentrically with the tube 30. The offset greatly reduces the likelihood of the engagement of the tip of the preform rod 22 with the wall of the tube 30.

After the offset 63 is formed, the centering device is remove after which the ring-type torch 60 is caused to be moved upwardly from the base of the tube 30 to a top end 65 (see FIG. 1). For a predetermined dwell time, the torch 60 remains at or near the top end 65 of the tube 30 to cause the tube to become sealed to the preform rod 22 at that point.

As the torch 60 begins its predetermined dwell time at or near the top end of the tube 30, apparatus 70 (see FIG. 1) having a portion 72 which extends through the arm 35 and holder 33 and which is connected to a lower end of the tube is controlled to cause the pressure within the tube to be substantially less than that outside the tube. As a result, the sealing of the top end portion of the tube 30 to the preform rod 22 is accomplished with a vacuum assist. In a preferred embodiment, the pressure inside the tube may be in the range of about 0.15 to 0.2 atmosphere, for example. Advantageously, the gimbal-type chuck 32 functions as a vacuum coupler and through its tight seal with the tube 30 allows the vacuum between the tube and the rod 22 to be maintained.

Figure 8:
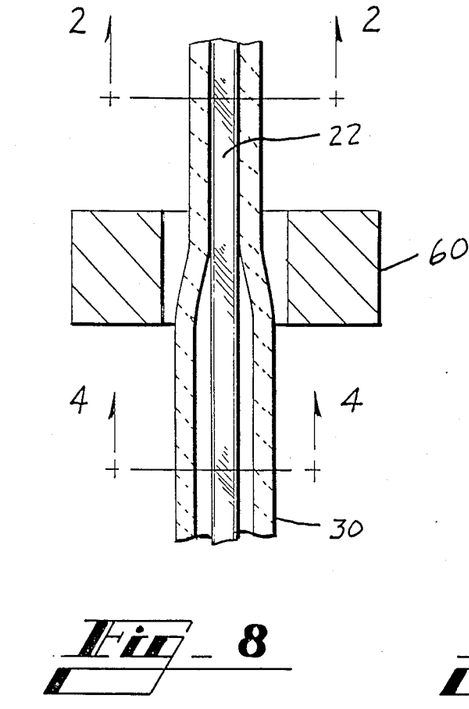
FIG. 8 is an elevational view partially in section which shows a torch being moved along a tube within which is disposed a preform rod to cause the tube to become collapsed onto the preform rod.

After the dwell time, the torch 60 is caused to be moved downwardly, traversing the length of the tube. The vacuum which is maintained as the torch 60 traverses the length of the tube 30, subjecting successive increments of length of the tube to a zone of heat, causes the tube 30 to be collapsed at a relatively rapid rate onto the preform rod 22 (see FIG. 8) to provide the overclad preform of FIG. 2. The zone of heat is controlled to avoid excessively high temperatures. By using lower temperatures, an axial temperature gradient is established over an increment of length of the tube. This allows the tube 30 to be maintained in alignment about the preform rod 22 because of the stiffness of the tube across the zone of heat.

As the torch 60 traverses the length of the tube 30, the tube and preform rod 22 are caused to rotate. This is done because the heating of the tube 30 and the rod 22 generally is not symmetrical. Also, the tube 30 and the preform rod 22 therewithin may not be precisely centered within the confines of the torch 60. It has been found that the resulting rod and tube product improves with slower rotational speeds. As the speed is increased, centrifugal effects increase and adversely affect eccentricity. In a preferred embodiment, the rotational velocity is about 10 rpm.

It should be noted that in the preferred embodiment of this invention, the pressure inside the tube 30 is reduced over that external thereto. In the preferred embodiment, this is done by connecting the tube 30 through the vacuum coupler chuck 32 to the source 70 of vacuum. However, the pressure outside the tube 30 could be increased to be substantially greater than that inside the tube to achieve the same result. What is important is that there be a substantial pressure gradient between the outside of the tube 30 and the inside with the pressure on the outside being substantially greater than that inside.

The methods and apparatus of this invention result in a substantially increased rate of collapse of the tube 30 onto the preform rod 22. With the methods and apparatus of this invention, collapse rates of about 7 cm/min have been achieved. This compares to a collapse rate of about 1 cm/min in a horizontal lathe arrangement without a pressure gradient other than that used in preform manufacture by the MCVD process. As is well known, in that process, preform tube collapse is accomplished while the pressure inside the tube is slightly greater than atmospheric.

The above-described pressure gradient is helpful in accelerating the rate of collapse of the tube on the rod; however, additional steps are taken to avoid ellipticities in the final preform and to cause the overcladding of the final preform to be concentric with the core of the preform rod. The additional steps include controlling the clearance between the tube and the rod, controlling the zone of heat, and controlling the initial concentricity between the tube 30 and the inserted rod. By controlling the width of the zone of heat and the temperature therein, as well as the characteristics of the gradient, and by controlling the clearance between the tube 30 and the preform rod 22, and the initial concentricity, vacuum assist may be used to accelerate tube collapse without any resulting ellipticities in the final preform.

Contrary to what might be expected from the disclosures of the prior art, the quality of the resulting overclad preform rod is relatively high when using the methods and apparatus of this invention. From the prior art, it appears that positive pressure during collapse is needed, but that the use of vacuum results in ellipticity of portions of the preform. For example, it is known that in order to make a polarized optical fiber, an optical preform tube is fabricated and then collapsed under conditions wherein a vacuum within the tube is maintained. The vacuum causes ellipticities in the tube to be increased so that the fiber upon collapse is in a more elliptical state than was the tube at the beginning of the collapse process. A non-zero ellipticity typically is produced by including a vacuum within the tube during an initial portion of the collapse. An internal pressure is then applied during collapse that increases as the radius of the tube decreases, so as to maintain the given degree of ellipticity during further collapse of the tube.

It has been found that it is relatively simple to flatten a tube when the rod therein is relatively small compared to the tube. The prior art relies on this principle to achieve ellipticities in the final configuration of an overclad tube. However, with rod sizes which approach the inner diameter of the tube, the tube does not have sufficient room to flatten. In the methods and apparatus of the present invention, the clearance between the inner wall of the tube 30 and the outer surface of the preform rod 22 is controlled and is sufficiently small so that ellipticity is minimized.

Further, according to the prior art, circularity may be preserved during collapse with the aid of positive internal pressure. See U.S. Pat. No. 4,154,591 which issued on May 15, 1979 in the names of W. G. French and W. Tasker. However, it has been found that the use of pressure slightly greater than atmospheric such as during preform collapse in the MCVD process has not provided acceptable results for providing an overclad tube. Collapse with the positive pressure technique of the MCVD process has been found to be non-symmetrical, resulting in the formation of air voids. In contrast, it has been found that voids do not occur at the interface of the preform rod and tube when using methods and apparatus of this invention.

As should be evident, care has been taken to minimize eccentricity of the final preform product. If done on a lathe, albeit vertical, most of the heat is provided to the tube 30 and hence only the tube is deformed. If the tube 30 is off center, it may touch the rod at one point first and the material adhering to the rod is immobilized. The tube wall thickness at the point where the sticking first occurs is frozen. The remainder of the tube 30 continues to collapse. and, as it does, the wall thickness of the tube increases. Hence, the portion of the overclad preform where the tube is last to touch the preform rod has the greatest wall thickness, and the part that first touches the preform rod has its least wall thickness. These two locations are generally diametrically opposite to each other, resulting, undesirably, in eccentricity.

Unlike some prior art techniques where evacuation has been used to obtain elliptical shapes in the final rod and tube cross section, the methods and apparatus of this invention cause relatively rapid tube collapse while maintaining substantial concentricity of the rod and the tube. For example, it has been found that the eccentricity of fiber drawn from overclad preform rods produced in accordance with the methods and apparatus of this invention is less than one micron.

The zone of heat is controlled to cause the temperature gradient to be relatively steep. As is well known, the zone of heat is the zone extending from the location where the temperature reaches about 1600° C., which is the softening point of the glass used herein, to the location where it drops below that temperature. For the torch which is used in the vertical lathe arrangement of FIG. 1, the distance over which the temperature increases from 1600° C. to its maximum value is relatively small and typically is about 10 mm. Problems are avoided by controlling the zone of heat so that it is relatively narrow and relatively steep.

Furthermore, the zone of heat is controlled so that as a result of collapse, substantially all the inner surface of the tube 30 is in engagement with the preform rod. This helps to avoid the formation of voids between the tube and the rod which may result in degradation of the optical fiber strength. Also, the collapsed tube is concentric with respect to the rod because of the initial alignment precautions taken and because the width of the hot zone is not so great that it causes instabilities.

Other variations of the arrangement which is shown in FIG. 1 may be used. For example, it has been demonstrated that the rod 22 instead of the tube 30 may be mounted in the chuck 32, and the tube 30, instead of the rod, mounted in the overhead chuck 41.

Figure 9:
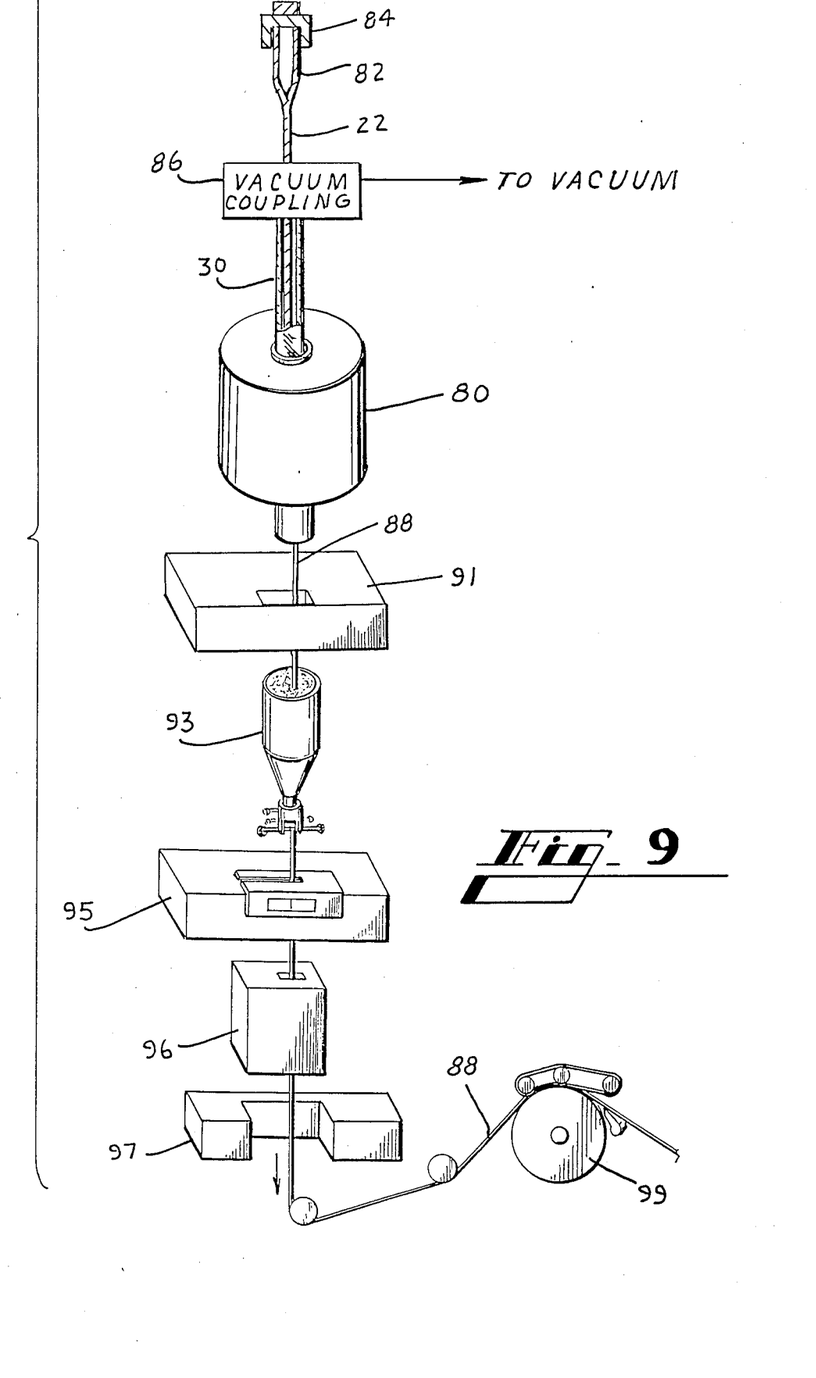
FIG. 9 is another apparatus which may be used to cause a tube to be collapsed onto a preform rod, during the drawing of optical fiber, to overclad the rod.

The methods and apparatus of this invention also are applicable to the collapsing of the tube 30 onto the preform rod 22 as the preform rod and tube are advanced into a draw furnace 80 (See FIG. 9). In the vertical lathe arrangement, the tube 30 is heated and the heat energy re-radiated into the rod. In the draw furnace, heat energy is provided directly into both the tube 30 and the preform rod 22. Furthermore, the maximum zone of heat temperature in the furnace is greater than that in the lathe. Thus, both the preform rod 22 and the tube 30 experience a greater temperature resulting in a lower vicosity and greater fluidity during the furnace collapse of tube 30 onto preform rod 22 when compared to the aforementioned lathe collapse technique. However, an axisymmetric draw force acts on both the preform rod 22 and tube 30 during co-drawing. The combination of greater fluidity and axisymmetric draw force acting on the preform rod 22 and the tube 30 in the co-drawing technique for overcladding provide a self-centering mechanism for the rod and tube assembly which tends to oppose the eccentricity of preform rod 22 in the tube 30 as described earlier.

As can be seen in FIG. 9, the preform rod 22 which is provided with a handle 82 is suspended from a chuck 84. The entrance of the preform rod 22 into the tube 30 is provided with a vacuum coupling 86 to seal the entrance and allow the volume between the inner wall of the tube and the outer surface of the rod to be maintained at a predetermined pressure. The preform rod 22 and the tube 30 extend into the furnace 80, which may be a zirconia induction furnace, for example.

As the preform rod 22 and the tube 30 are fed into the furnace, a source of vacuum (not shown) in a preferred embodiment is connected through the vacuum coupling 86 to the space between the tube and the preform rod. Successive portions of the length of the tube 30 within the furnace 80 are caused to be collapsed onto the preform rod 22 and an optical fiber 88 is drawn from the overclad preform. In the draw-down portion of the furnace, where the tube 30 and the rod 22 become fluid at the same time, the draw force from the fiber is thought to provide a self-centering mechanism for the tube and the rod. Alignment is aided by an axially symmetric drawing tension on both the preform rod 22 and the tube 30.

The diameter of the drawn optical fiber 88 is measured by a device 91 at a point shortly after it exits from the furnace and this measured value becomes an input to a control system. Within the control system, the measured diameter is compared to the desired value and an output signal is generated to adjust the draw speed such that the optical fiber diameter approaches the desired value.

After the diameter of the optical fiber 88 is measured, a protective coating is applied to it by an apparatus 93. Then, after the coated fiber 88 passes through a centering gauge 95, a device 96 for treating the coating and a device 97 for measuring the outer diameter of the coated fiber, it is moved through a capstan 99 and is spooled for testing and storage prior to subsequent cable operations. The preservation of the intrinsically high strength of optical fibers is important during the ribboning, jacketing, connectorization and cabling of the fibers and in their service lifetime.

When using a draw furnace to collapse the tube 30, the viscosity of the glass is lower because the temperature is higher. This allows flow of the glass but the axisymmetric draw force facilitates a concentric draw of the preform rod 22 and the tube 30 collapsed thereabout. In the furnace, typically, the ascent to the maximum temperature is more steep than when using the ring torch, but the traverse of the rod through the zone of heat may be slower than in the lathe arrangement. Inasmuch as the tube collapse is time-temperature dependent and inasmuch as the temperature of the furnace is somewhat fixed, control of the zone of heat is achieved by controlling its length along the tube 30. The temperature gradient is relatively step in the area where the tube collapses onto the rod.

Figure 10:
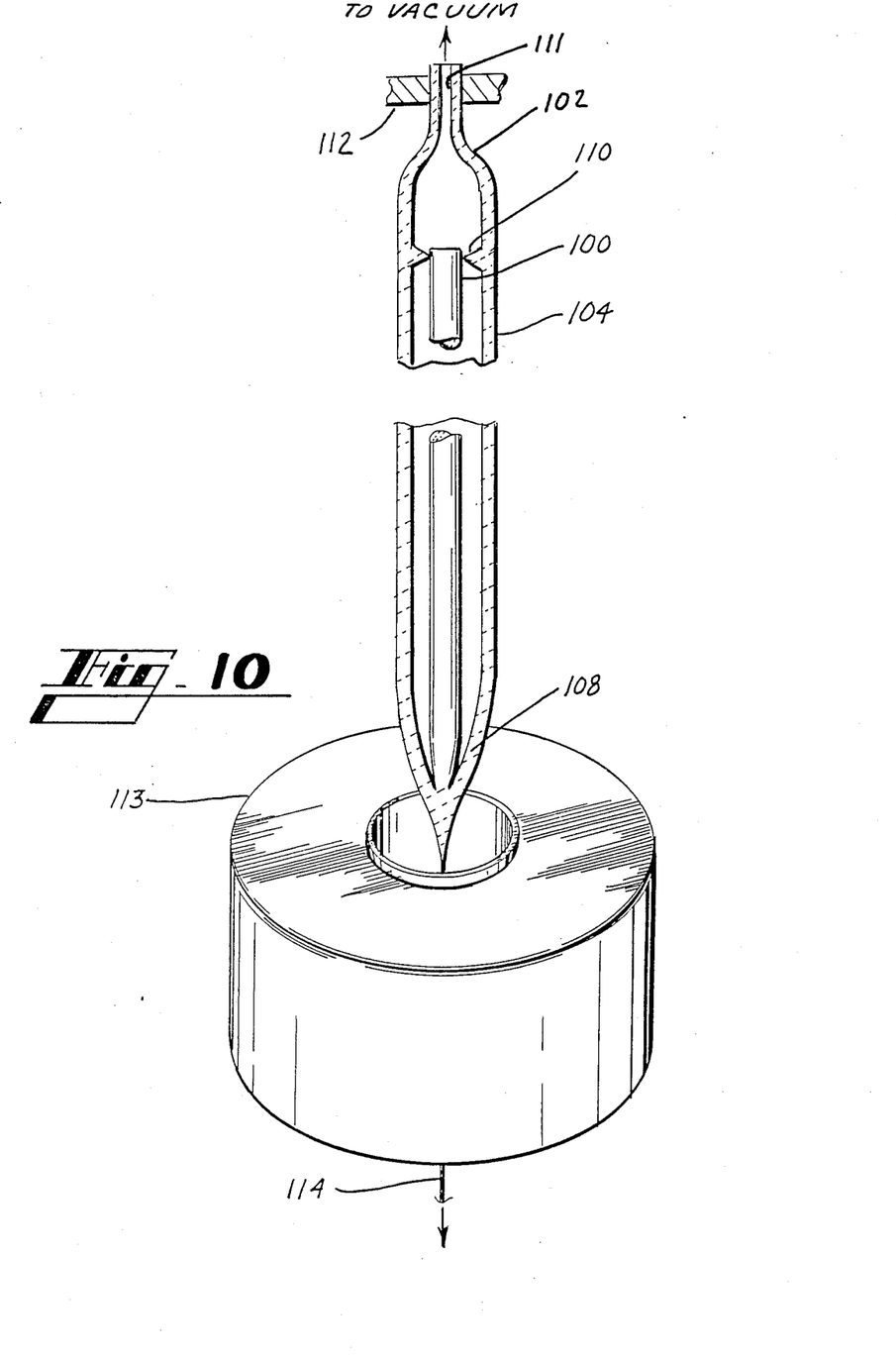
FIG. 10 is an alternate embodiment of an arrangement in which a tube is caused to be collapsed onto a preform rod during the drawing of optical fiber.

In FIG. 10, there is shown an alternate embodiment of an arrangement in which a tube is collapsed onto a preform rod during the drawing of optical fiber. A preform rod 100 is provided by an MCVD process, for example. A tube 104 which has an inner diameter only slightly greater than the outer diameter of the preform rod and which has a handle 102 is caused to be disposed about the preform rod. The tube 104 is caused to be sealed to the rod at an end 108. Subsequently, another portion of the tube is tacked to the rod at a plurality of locations 110—110 about the pheiphery of the inner surface of the tube. An opening 111 through the handle end 102 and connection through a supporting chuck 112 to a source of vacuum, for example, is provided to allow control of the pressure within the tube during the drawing of fiber. This arrangement maximizes the use of the relatively expensive preform inasmuch as none of it is used in supporting the rod and tube from the overhead chuck.

The handle 102 of the tube is supported to cause the preform rod with the tube sealed thereto to be suspended above a furnace 113. Then, as in the embodiment shown in FIG. 9, the preform rod and the tube are advanced into the furance to facilitate the drawing of an optical fiber 114 therefrom. As the length of the tube 104 decreases, the pressure within the tube is adjusted to maintain the gradient between it and that outside the tube within a controlled range.

A relatively low eccentricity overclad preform has been produced by optimizing the heat zone temperature and width which control the glass viscosity, the magnitude of the clearance between the preform rod and the overcladding tube and the pressure therein, and the concentricity of the preform rod inside the overcladding tube. All these parameters influence the process speed and resultant fiber geometry whereas the fiber strength is affected by the characteristics of the heat zone. The optimization of these parameters has resulted in a rapid overcladding process that provides optical fiber exhibiting strength and core concentricity which meet the specifications required in current commercial optical fiber systems. The overcladding process described herein significantly increases production capacity while substantially avoiding decreased fiber yield.

It is to be understood that the above-described arrangements are simply illustrative of the invention. Other arrangements may be devised by those skilled in the art which will embody the principles of the invention and fall within the spirit and scope thereof.

What is claimed is:

1. A method of providing an overclad optical preform in which an overcladding is disposed substantially concentrically about a core of an optical preform rod, said method including the steps of:

providing a substantially straight optical preform rod which includes a core and a cladding which has an outer diameter and a longitudinal axis;

providing an overcladding tube which is made of an optical material having suitable optical and geometrical characteristics and which has an inner diameter with the difference between the inner diameter of the tube and the outer diameter of the rod being relatively small, said overcladding tube having a longitudinal axis;

causing the preform rod to become disposed within the tube and then holding the preform rod at one end and the tube at an opposite end in positions fixed relative to each other in directions along the longitudinal axes thereof; and subjecting successive increments of length of the tube with the rod disposed therein to a relatively narrow zone of heat having a controlled temperature gradient; while causing a pressure gradient between the outside and the inside of the tube to be established and to be maintained with the pressure outside being substantially greater than that inside, the pressure gradient in cooperation with the relatively narrow zone of heat and the relatively small difference between the inner diameter of the tube and the outer diameter of the rod being effective to cause the tube to collapse substantially into engagement with the preform rod and with the overcladding tube being disposed substantially concentrically about the core of the preform rod, the difference between the inner diameter of the tube and the outer diameter of the rod being sufficiently small to prevent substantially any buckling of the tube as the tube is caused to collapse onto the rod.

2. A method of providing an overclad optical preform in which an overcladding is disposed substantially concentrically about an optical preform rod, said method including the steps of:

providing a substantially straight optical preform rod which has an outer diameter and a longitudinal axis;

providing an overcladding tube which is made of an optical material having suitable optical and geometrical characteristics and which has an inner diameter with the difference between the inner diameter of the tube and the outer diameter of the rod being relatively small, said overcladding tube having a longitudinal axis;

causing the preform rod to become disposed within the tube and then supporting individually the preform rod and the tube in positions substantially fixed relative to each other in directions along the longitudinal axes thereof; and subjecting successive increments of length of the tube with the rod disposed therein to a relatively narrow zone of heat having a controlled temperature gradient; while causing a pressure gradient between the outside and the inside of the tube to be esttablished and to be maintained with the pressure outside being substantially greater than that inside, the cooperation of the pressure gradient with said relatively narrow zone of heat and said relatively small difference between the outer diameter of the rod and the inner diameter of said tube being effective to collapse the tube substantially into engagement with the preform rod and with the overcladding tube being disposed substantially concentrically about the preform rod, with the difference between the inner diameter of the tube and the ouer diameter of the rod being sufficiently small to prevent substantially any buckling of the tube as the tube is caused to collapse onto the rod.

3. The method of claim 1, wherein prior to successive increments of the length of the tube being subjected to the zone of heat, an open end portion of the tube is caused to become sealed to the preform rod which extends into the tube, and wherein the pressure gradient is established by connecting the tube to a source of vacuum prior to the end portion of the tube being caused to become sealed to the preform rod.

4. The method of claim 3, wherein the pressure within the tube is in the range of about 0.15 to 0.2 atmosphere.

5. The method of claim 1, wherein the pressure gradient is caused by inceasing the pressure outside the tube.

6. The method of claim 23, wherein the preform rod is caused to be disposed substantially concentrically within the tube and the clearance between the tube and the preform rod does not exceed about 0.75 mm.

7. The method of claim 23, wherein the clearance between the tube and the preform rod does not exceed a value of about 1.5 mm.

8. The method of claim 23, wherein the temperature within the zone of heat is in the range of about 1600°–2200° C.

9. The method of claim 23, wherein said step of subjecting is carried out so that the zone of heat has a relatively steep temperature gradient.

10. The method of claim 23, wherein subsequent to the disposition of the preform rod in the tube, the portion of the preform rod adjacent to its entrance into the tube is caused to become disposed substantially concentrically with respect to said tube.

11. The method of claim 10, wherein the tube is subjected to heat energy for a predetermined time at a location adjacent to an end of the preform rod therein to allow the position of the tube between an entrance of the tube and a free end of the preform rod to be adjusted and to become substantially coaxial with the tube.

12. The method of claim 1, wherein the heat is applied to successive portions of length of the tube and preform rod therein in a furnace into which the rod and tube are advanced and from which an optical fiber is drawn from the rod and tube collapsed thereabout.

13. The method of claim 12, wherein prior to the insertion of the rod and the tube into the furnace, the rod is inserted into the tube and sealed to the tube at one end and connected in a plurality of locations at its other end to the tube.

14. The method of claim 1, wherein the preform rod and the tube are supported so that their longitudinal axes are substantially vertical.

15. An apparatus for overcladding an optical preform rod, said apparatus including:

first supporting means for holding a preform rod which is substantially straight along a longitudinal axis thereof so that the preform rod may be turned rotatably about its longitudinal axis;

second supporting means for holding a tube which is made of an optical material having predetermined characteristics and which has a longitudinal axis so that the tube may be turned rotatably about its longitudinal axis, said first and second supporting means allowing the preform rod to be held with a substantial portion of its length disposed in the tube, the tube having an inner diameter that is greater than an outer diameter of the rod to provide a relatively small clearance therebetween;

means for causing the preform rod and the tube to be turned rotatably each about its longitudinal axis;

heating means for causing successive increments of length of the tube with the rod therein to be subjected to a relatively narrow zone of heat while the tube and the rod are being turned rotatably; and means rendered effective by said heating means causing successive increments of length of the tube and rod therein to be subjected to a relatively narrow zone of heat for establishing and for maintaining a pressure gradient between the inside and outside of the tube such that the pressure outside the tube is substantially greater than that inside, the cooperation of said pressure gradient, said relatively narrow zone of heat and said relatively small clearance between the tube an the rod being effective to cause said tube to be collapsed onto the rod, said clearance between the tube and the rod being sufficiently small to prevent any significant buckling of the tube as it is collapsed onto the rod.

16. The apparatus of claim 19, wherein said means for establishing a pressure gradient causes a vacuum to be applied to the tube.

17. The apparatus of claim 19, wherein said heating means includes a torch and said apparatus includes means for causing relative motion between the tube and said torch.

18. The method of claim 2, wherein the preform rod and the overcladding tube are caused to be turned rotatably each about its longitudinal axis as successive increments of length of the tube with the rod disposed therein are subjected to the zone of heat.

19. The apparatus of claim 15, which also includes means adapted to be disposed about the tube at the location where the rod extends into the tube and for causing the rod and the tube to be disposed concentrically with respect to each other at that location.

20. The apparatus of claim 19, wherein said first and second supporting means support the preform rod and tube so that their longitudinal axes are substantially vertical.

21. The apparatus of claim 20, wherein said second supporting means allows the tube to be moved pivotally about a lower end thereof.

22. A method of making an optical fiber, said method including steps of:

providing a substantially straight optical preform rod which has an outer diameter and a longitudinal axis;

providing an overcladding tube which is made of an optical material having suitable optical and geometrical characteristics and which has an inner diameter with the difference between the inner diameter of the tube and the outer diameter of the rod being relatively small, said overcladding tube having a longitudinal axis;

causing the preform rod to become disposed within the tube and then supporting individually the preform rod and the tube in positions substantially fixed relative to each other in directions along the longitudinal axes thereof;

subjecting successive increments of length of the tube with the rod disposed therein to a relatively narrow zone of heat having a controlled temperature gradient; while causing a pressure gradient between the outside and the inside of the tube to be established and to be maintained with the pressure outside being substantially greater than that inside and to cooperate with said relatively narrow zone of heat and the relatively small difference between the outer diameter of the rod and the inner diameter of the tube to cause the tube to be collapsed into engagement with the preform rod to provide an overclad preform in which the overcladding tube is disposed substantially concentircally about the preform rod, the difference between the inner diameter of the tube and the outer diameter of the rod being sufficiently small to prevent substantially buckling of the tube as the tube is caused to collapse onto the rod; and drawing optical fiber from the overclad optical preform.

23. The method of claim 22, wherein the preform rod and the overcladding tube are caused to be turned rotatably each about its longitudinal axis as successive increments of length of the tube with the rod disposed therein are subjected to the zone of heat.

* * * * *